March 30, 1926.
E. E. WOOD
MACHINE FOR MAKING KNIFE BLADES
Filed July 25, 1921
1,578,790
5 Sheets-Sheet 1
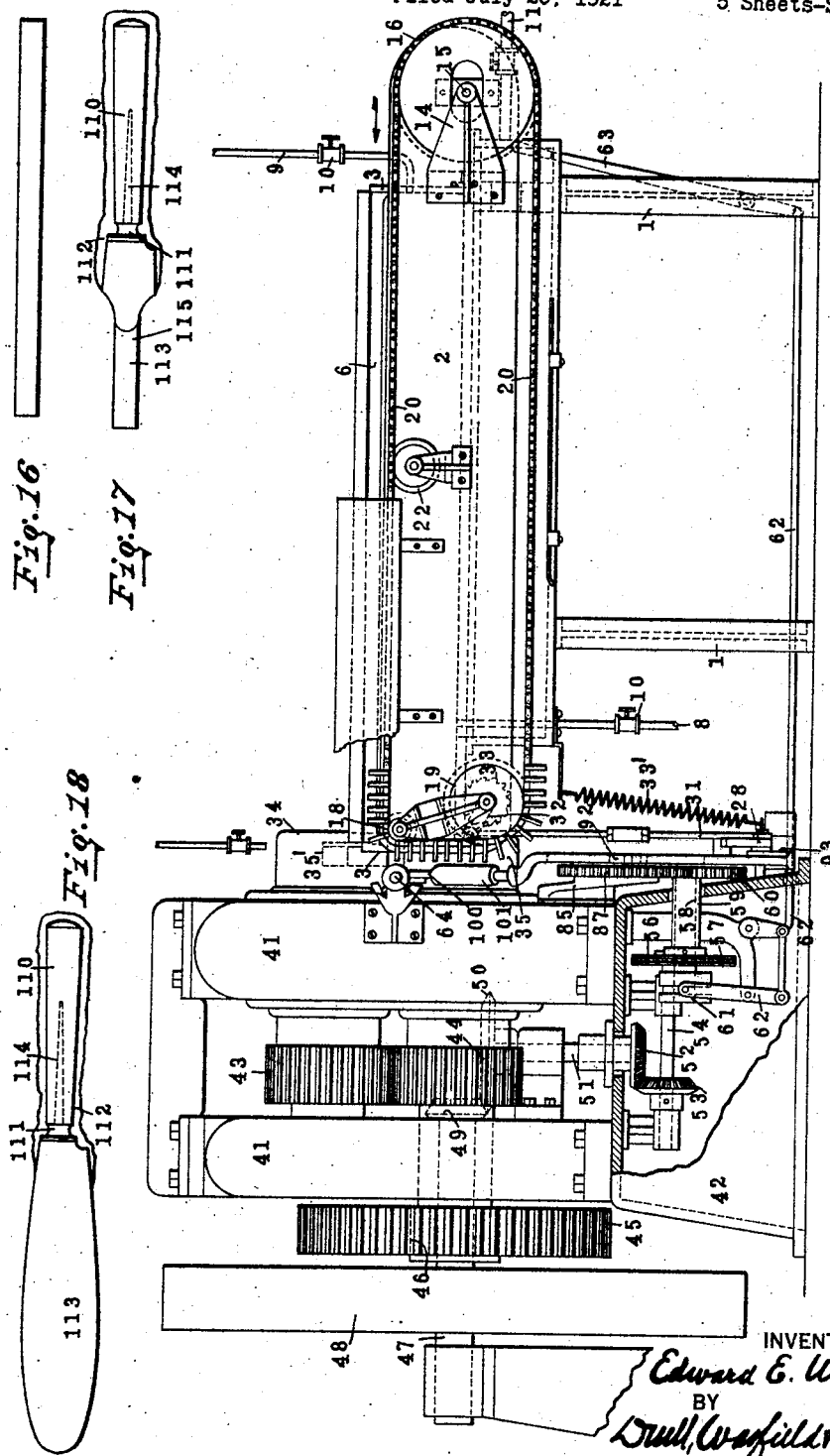
INVENTOR
Edward E. Wood
BY
Duell, Warfield & Duell
ATTORNEY March 30, 1926. 1,578,790
E. E. WOOD
MACHINE FOR MAKING KNIFE BLADES
Filed July 25, 1921  5 Sheets-Sheet 2
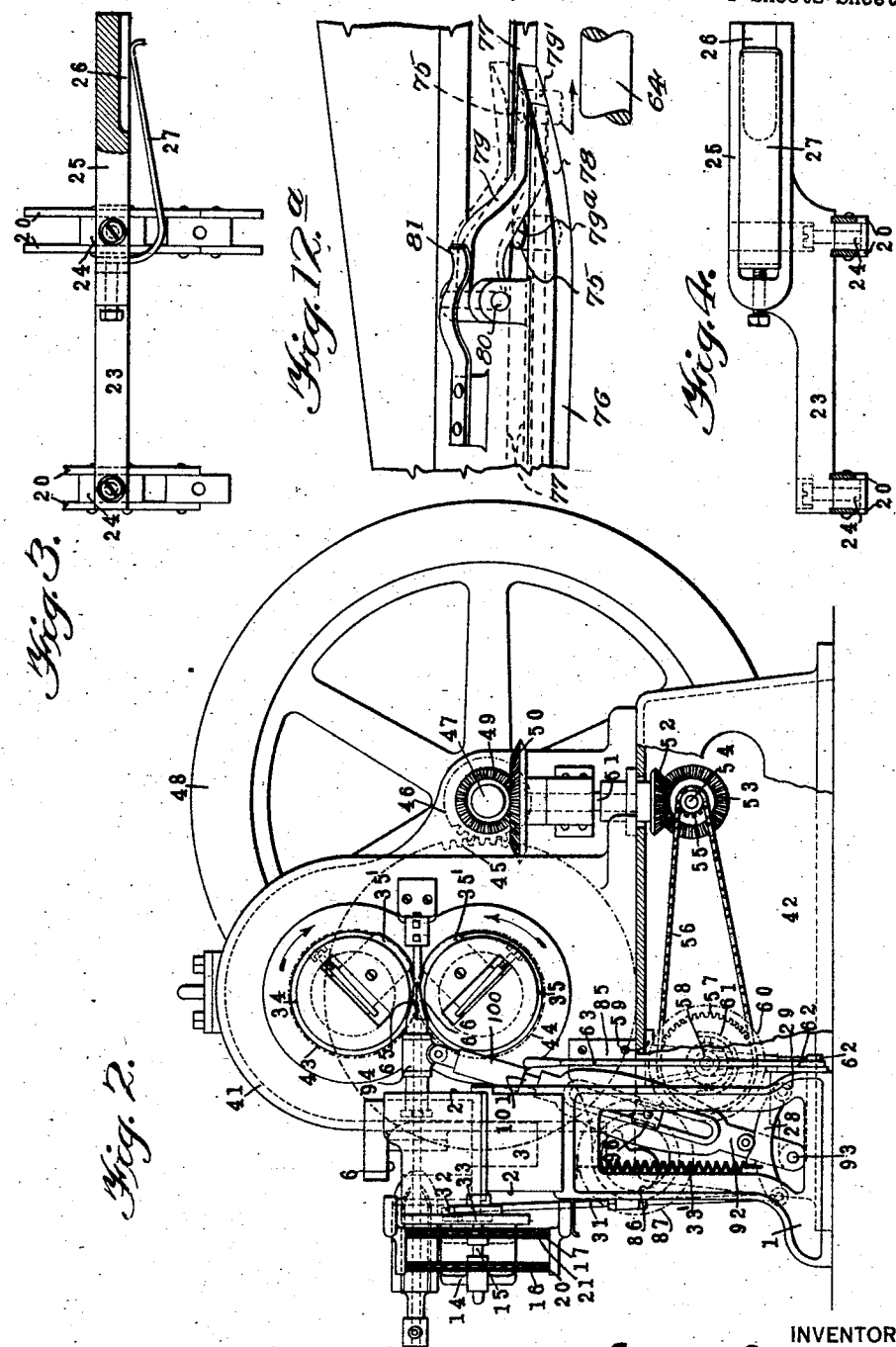
INVENTOR
Edward E. Wood
BY
Duell, Warfield & Duell
ATTORNEY

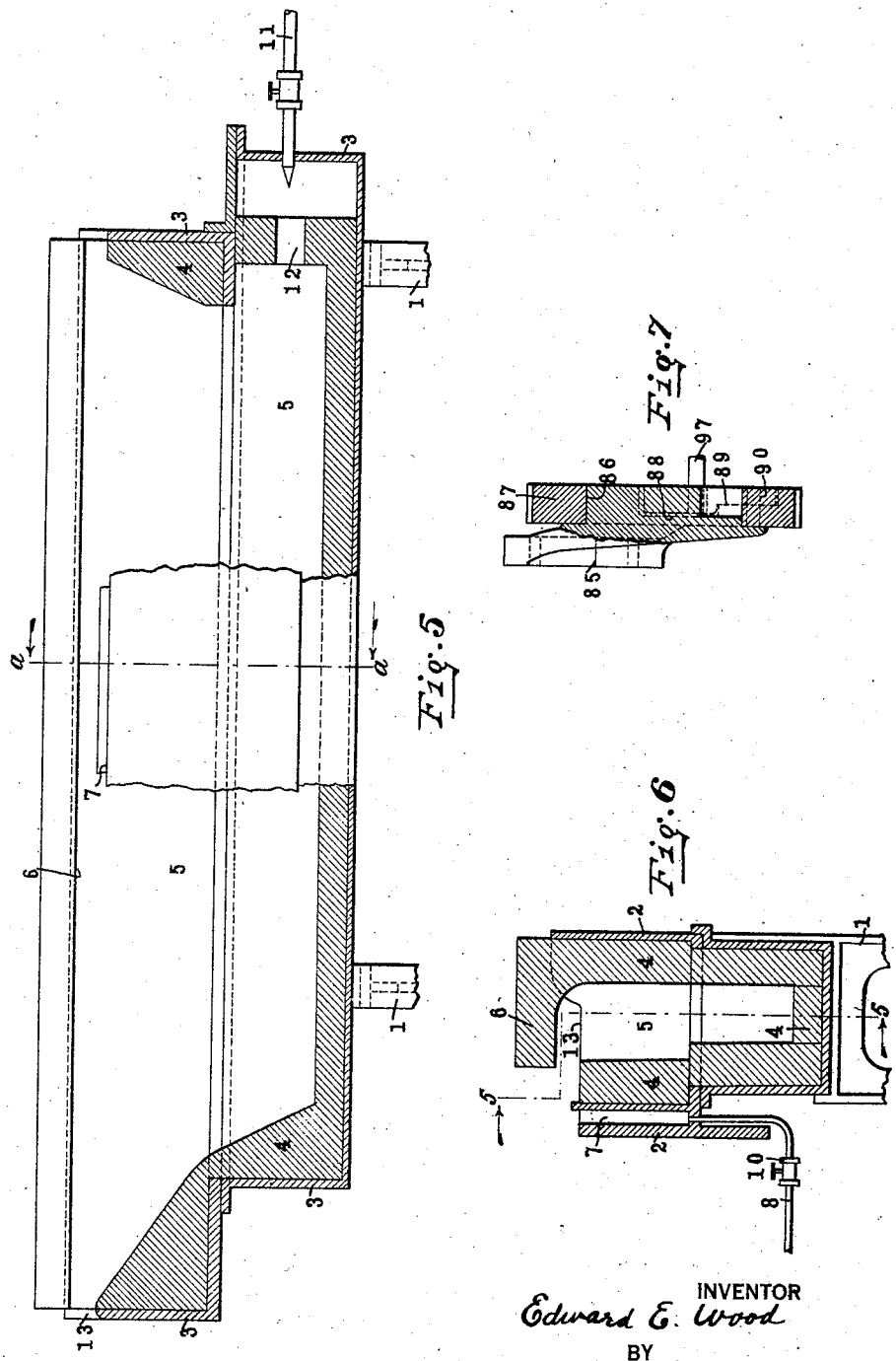

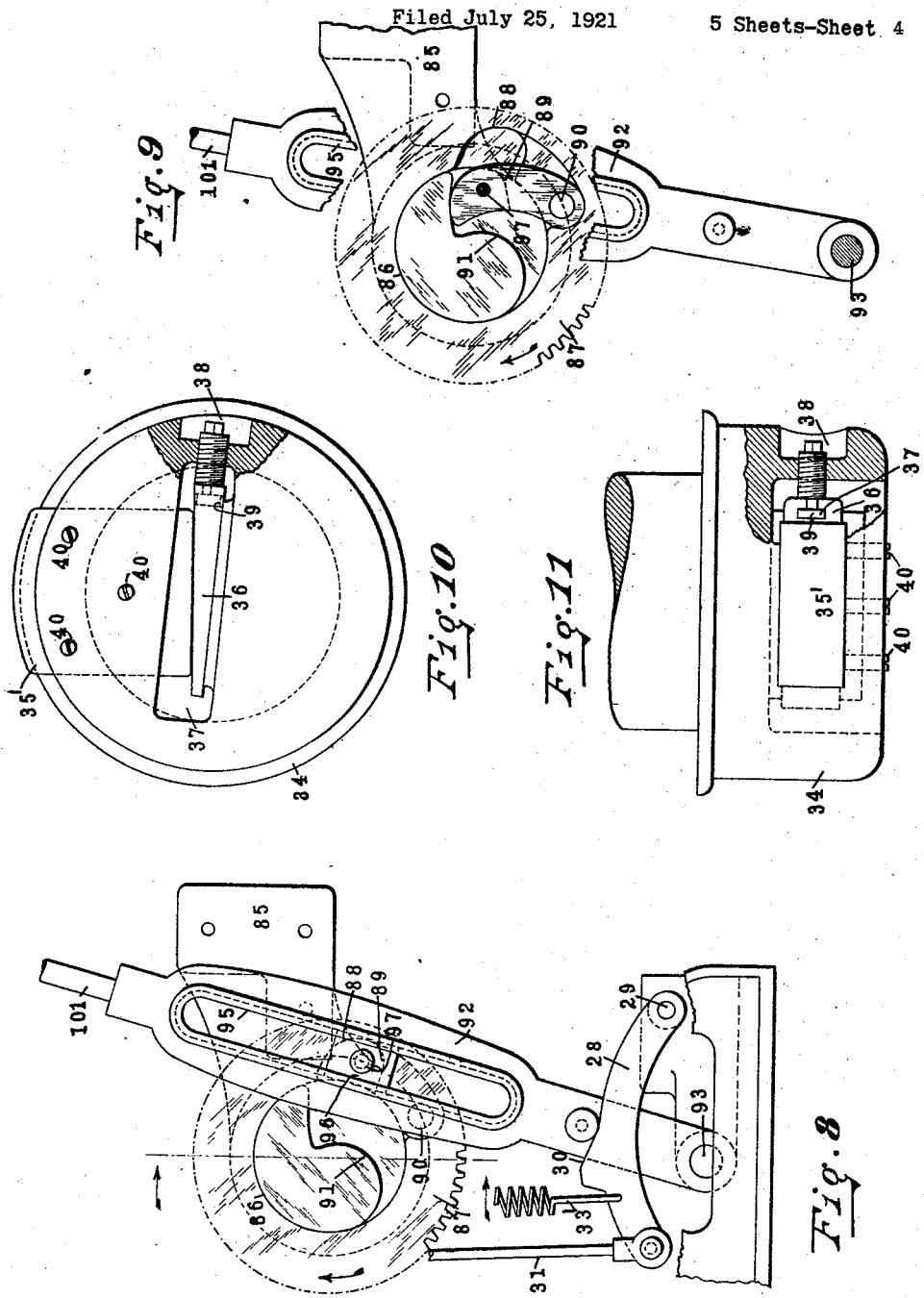

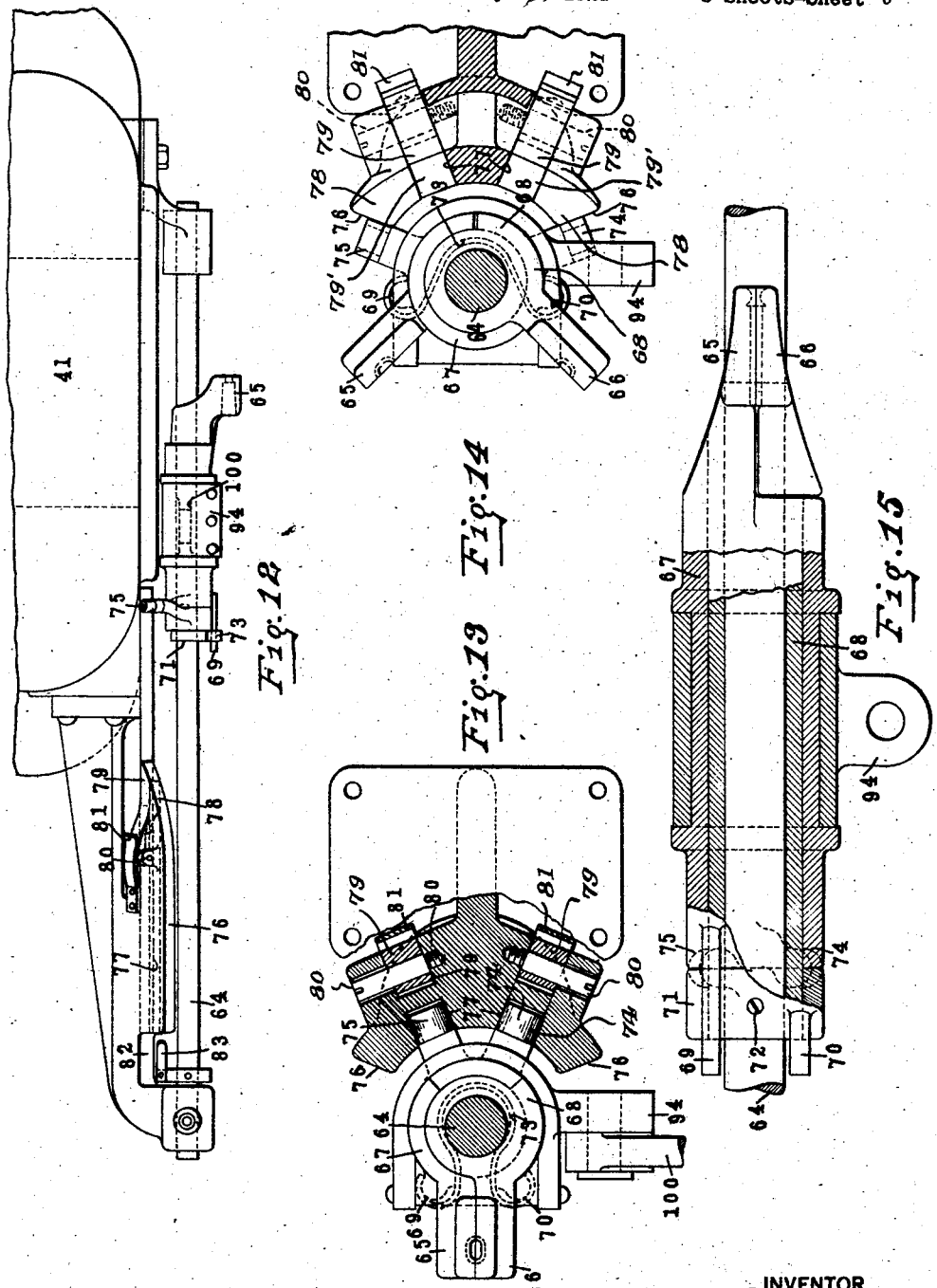

Patented Mar. 30, 1926.

1,578,790

UNITED STATES PATENT OFFICE.

EDWARD E. WOOD, OF NORTHAMPTON, MASSACHUSETTS, ASSIGNOR TO WM. A. ROGERS, LIMITED, OF TORONTO, CANADA, A CORPORATION OF ONTARIO.

MACHINE FOR MAKING KNIFE BLADES.

Application filed July 25, 1921. Serial No. 487,363.

*To all whom it may concern:*

Be it known that I, EDWARD E. WOOD, a citizen of the United States, residing at Northampton, in the county of Hampshire and State of Massachusetts, have invented certain new and useful Improvements in Machines for Making Knife Blades, of which the following is a full, clear, and exact description, such as will enable others skilled in the art to which it appertains to make and use the same.

This invention relates to methods and apparatus for making metallic implements and with respect to its more specific features to methods and apparatus for making knife blades and the like which include a handle or tang.

One of the objects of the invention is the provision of a practical method for fashioning knife blades accurately and expeditiously and largely as a continuous operation.

Another object of the invention is the provision of an efficient method for fashioning knife blades accurately and expeditiously, including a single rolling operation which lengthens, widens and compresses the metallic blank or stock and otherwise gives characteristic and predetermined shape and size to the blade, so that but a simple subsequent operation is required to place the blade in condition for polishing or silvering as may be desired.

Another object of the invention is the provision of a practical automatic apparatus for making knife blades and the like capable of automatically heat treating and swaging the blanks from which the blades are made.

Another object of the invention is the provision of a simple and efficient machine for feeding and rolling blanks into knife blades requiring but one subsequent fashioning operation to produce the blade in condition for polishing.

Another object of the invention is the provision of a simple and efficient mechanism for supplying swaging rolls with heated blanks one after another and holding the blanks while being swaged.

Another object of the invention is the provision of a machine for the purpose referred to, of simple construction and readily accessible for conduct and view of operations.

Other objects will be in part obvious and in part pointed out hereinafter.

The invention accordingly consists in the several steps and the relation and order of one or more of such steps with relation to each of the others thereof, which will be exemplified in the hereinafter disclosed method, and the scope of the application of which will be indicated in the claims that follow.

In the accompanying drawings forming part of this specification, wherein similar reference characters refer to similar parts throughout the several views, Figure 1 is a front elevation of a machine for carrying out the greater portion of the method and embodying the invention;

Fig. 2 is an end elevation of Fig. 1;

Fig. 3 is a detail of a portion of the blank carrier with a blank holder attached;

Fig. 4 is an end elevation of a blank holder;

Fig. 5 is a front view partly in longitudinal section of a furnace employed in the machine;

Fig. 6 is a cross-section of Fig. 5 on the line 6—6;

Fig. 7 is a detail of the gripper operating mechanism;

Fig. 8 is an end view of a portion of the gripper operating mechanism;

Fig. 9 is a view of a portion of Fig. 8 with certain of the parts in different positions from that illustrated in Fig. 8;

Fig. 10 is an end view of one of the swaging rolls partly in section;

Fig. 11 is a plan view of one of the swaging rolls partly in section;

Fig. 12 is a plan view illustrating the gripper, its guide and the mechanism for opening and closing the gripper;

Fig. 12ª is an enlarged fragmentary plan view of the switch mechanism for controlling the gripper.

Fig. 13 is a cross-section through Fig. 12 on an enlarged scale;

Fig. 14 is a cross-section at a different point on Fig. 12 from Fig. 13 and illustrating the gripper and related parts in open position;

Fig. 15 is a side elevation of the gripper partly in section;

Fig. 16 represents a stock-blank from which a blade is made and

Figs. 17 and 18 represent the blank in two stages consequent on practicing the method.

Referring now more specifically to the drawings, the numerals 1 indicate legs resting on the floor and supporting the furnace. The furnace comprises a metallic box-like structure having side walls 2 and end walls 3 and lined with fire brick 4, the fire brick on one side overhanging the combustion chamber 5 as indicated at 6 (Fig. 6). On one side the furnace is provided with a water-jacket 7 and pipes 8 and 9 communicate with the water jacket at opposite ends for establishing a flow through the jacket. These pipes may be provided with suitable hand-controlled valves 10. At the right hand end of the furnace in Fig. 1 air and gas nozzles diagrammatically illustrated at 11 supply a combustible gas and air under controllable pressure to the lower part of the combustion chamber, the flame being projected through an orifice 12 in the fire brick and thence substantially filling the combustion chamber up to the opposite open end 13, the overhanging fire brick 6 serving in a measure to confine the flame and the heat and direct the latter toward the blanks as will hereinafter appear.

At one end of the furnace is a bracket 14 in which is rotatably mounted the shaft 15 of a double sprocket wheel comprising the wheels 16 and 17. At the opposite end of the furnace are supported guide rollers 18 and sprocket wheels 19. Over the sprocket wheels 16 and 17, the sprocket wheels 19, and the rollers 18, pass the sprocket chains 20 and 21, there being two parallel sprocket chains passing around the several parts referred to and disposed side by side. Intermediate the ends of the upper ply of these chains is a suitable supporting roll 22. To opposite links of the two chains are connected blank holders clearly illustrated in Figs. 3 and 4. Each blank holder comprises a cross piece 23 screwed to blocks 24 carried by the links of the sprocket chains, the cross piece having an elevated portion 25 in the side of which is a recess 26 for the reception of the blank to be heated. A spring 27 removably fastened to the elevated portion 25 serves to yieldingly retain a blank in the recess 26. There is thus provided a blank carrier for translating the blanks over the combustion chamber of the furnace, the outer ends of the blanks coming in close contact with the flame in the combustion chamber, the blanks being progressively heated as they pass from the right toward the left end as viewed in Fig. 1. A temperature of 1600° F. is attained by the blanks during their passage through the furnace.

Referring now more particularly to Figs. 2 and 8, the numeral 28 indicates a rock arm pivoted to a fixed frame at 29 and having a cam surface 30. To the outer end of the rock arm 28 is pivoted a connecting rod 31, the opposite end of which is pivoted to an arm 32 (Fig. 1) carrying a pawl which cooperates with a ratchet 33 fixed to the sprocket wheels 19, so that the rocking of the arm 28 rotates the sprocket wheel 19 intermittently and thereby effects an intermittent movement of the blank holders to progressively advance the blanks relatively to the furnace into the path of a gripper to be hereinafter described. Movement of the rock arm 28 in one direction is effected by a spring 33′, its movement in the opposite direction being positively effected, as will appear.

The numerals 34 and 35 indicate the rolls which carry the swaging dies. The die portions of the rolls are made removable and adjustable as indicated in Figs. 10 and 11. In each roll the die 35′ lies in a radial slot and rests upon a wedge block 36 which may be set in position through a longitudinal slot 37 in the roll. The circumference of the roll opposite the wedge block 36 is recessed as at 38 and a screw registers with the recess 38, has threaded connection with the roll and a headed rotary connection with the wedge block 36 as indicated at 39, so that rotation of the screw will move the wedge block in one direction or the other for adjustment of the die. After adjustment the die is pinned in place by screws 40.

A pair of swaging dies, or rolls, is employed, the rolls being of substantial size and rotatably mounted in heavy uprights or standards 41 which may be bolted to a bed 42 upstanding from the floor or ground. The rolls 34 and 35 have spur gears 43 and 44 fixed thereto and intermeshing, and to the lower roll 35 is fixed a large spur gear 45 in mesh with a smaller driving pinion 46 (Fig. 2) on the main driving shaft 47, which latter carries a fly wheel 48 and may be driven from any suitable source of power. For transmitting motion to certain other parts hereinafter described the driving shaft 47 carries a bevel pinion 49 meshing with a horizontally rotatable pinion 50 on the upper end of a vertical shaft 51, the latter carrying at its lower end a bevel pinion 52 in turn meshing with another bevel pinion 53 on a horizontal shaft 54. The shaft 54 has a sprocket wheel 55 which drives a sprocket chain 56 and this chain in turn drives a larger sprocket wheel 57 mounted for rotation on a horizontal shaft 58 mounted in a bracket bearing 59. At one end the shaft 58 carries a spur gear 60. At the opposite end of shaft 58 adjacent to the loosely rotatable sprocket wheel 57 is a clutch 61 non-rotatably mounted on the shaft but being slidable thereon to engage with the sprocket wheel 57 to compel rotation of the latter with the shaft. When the clutch is disengaged, the sprocket wheel 57 rotates idly on the shaft 58. Suitable clutch shifting devices may be employed for moving the clutch 61 from the side of the machine. The clutch shifter train is indicated generally by the numeral 62, the hand lever being indicated by the numeral 63.

The swaging portions or instrumentalities of the horizontal rolls 34 and 35 project outside the frame 41 so as to be readily accessible for manipulation of the dies and inspection of the work. The die portion of each swaging roll includes an intaglio die, that on one roll cooperating with that on the other as the rolls rotate to give predetermined shape and dimension to the blank operated on and to compress the blank material to the configuration suitable for the implement being formed, i. e., in the present instance a knife blade. For advancing the heated blanks into operative relation with the swaging dies a reciprocatory gripper is utilized. The numeral 64 (Fig. 12) indicates a horizontal guide rod supported in brackets bolted to the outside of the upstanding frame portions 41. This guide rod extends transversely of the path of movement of the blanks on the carrier and between the swaging rolls and in the present embodiment is of cylindrical shape. The gripper is longitudinally reciprocable on the guide rod 64 toward and from the swaging rolls and consequently reciprocates crosswise of the path of the blank holders on the carrier. The gripper comprises a pair of gripper jaws 65 and 66 adapted to open and close, these jaws extending, respectively, in radial directions from concentric telescopically related sleeves 67 and 68, the inner sleeve 68 being concentric with and rotatable on the guide rod 64 and the outer sleeve 67 being rotatable on the inner sleeve. On the sleeves 67 and 68 are lugs 69 and 70, the lug 70 projecting from a collar 71 pinned to an extended portion of the inner sleeve as indicated at 72, the collar 71 being rotatable with the inner sleeve. The numeral 73 (Fig. 14) indicates a spring of bent metal which passes partially around the guide rod 64, the ends of this sleeve cooperating with the lugs 69 and 70 so that the tension of the spring is exerted to rotate the sleeves 67 and 68 in a direction to close the gripper jaws.

Carried by and rotatable with the sleeves 67 and 68 are jaw operating dogs 74 and 75 extending in a generally radial direction from the sleeves, respectively, and including wheels or anti-friction rollers. As the dogs 74 and 75 are fixed to the sleeves, the spring 73 not only exerts its tension in a direction to close the gripper jaws but also to move the dogs 74 and 75 with the sleeves. Alongside the oscillatory path of movement of the gripper is a device which cooperates with the dogs 74 and 75 to open and close the grippers at predetermined times. For each jaw operating dog there is similar operating mechanism so that a description of the operating mechanism for one will answer for both. The numeral 76 indicates an outer track and the numeral 77 an inner track, these two tracks forming a pair of tracks spaced apart in a direction transversely of the guide rod 64. The outer track 76 curves toward the inner track as indicated at 78, Fig. 12, but between the two tracks at one end intervenes a switch 79 pivoted at 80 and urged into switching position by a spring 81. At the end opposite the switch the inner track extends beyond the other as indicated at 82. The inner track 77 extends rectilineally beyond the switch toward the swaging rolls 34, 35 a sufficient distance to permit the gripper jaws to remain in gripping position during the operation of swaging and this distance is also sufficient to permit retraction of the gripper beyond the swaging rolls without opening the gripper jaws. As shown in Figs. 12, 12$^a$ and 14, the switch 79 is pivoted to swing into and out of the slot which forms the track 77 and is provided at its forward or swinging end with an inclined face 79′ forming a continuation of the inclined curve face 78 when the switch is seated in the slot, the inclined face 79′ thereof then lying adjacent the face of track 77 and forming a bridge between the latter and the curved parts 78 of the track 76. The inner surface of the switch 79, intermediate its swinging end and the pivot 80, is formed with an inclined face or cam 79$^a$.

It will now be seen that as the gripper moves on its return or retractive stroke from the swaging rolls, the jaw operating dogs 74 and 75 will encounter the inclined faces 79′ of the switches 79 and thereby be deflected outwardly away from each other over the curved parts 78 of the tracks 76. This operation separates the gripper jaws, thus releasing the blank held therebetween. The tracks 78 being spaced from the tracks 77 will rotate the jaw operating dogs and in consequence also the gripper jaws, thus releasing the blank held between the latter. Ultimately the jaw operating dogs will escape from the corresponding rear ends of the outer tracks and be thrust by the spring 73 against the extended portions 82 of the inner tracks. As the dogs are thrust toward the extended portions of the inner tracks the gripper jaws will be closed upon the blank that the carrier has brought to position in the sphere of operation of the gripper jaws. In order to avoid any chance of overrunning as well as possible shock, a spring buffer 83 is employed to cushion the retractive movement of the gripper and divert the dogs into the inner track. Advance movement of the gripper will cause the dogs to run on the inner tracks and they will wipe against the inclined cam faces 79ª of the switches 79 swinging the latter on their pivots 80 out of the path of the dogs to the dot and dash lines shown in Fig. 12ª and permitting free passage thereof. After passage of the dogs the switches will be urged into switching position by the springs 81. The gripper jaws 65 and 66 are at one end of the gripper and when in gripping relation adjacent the swaging rolls lie in planes generally parallel to the axis of said rolls.

The numeral 85 (Figs. 8 and 9) indicates a substantial bracket having a bearing 86 on which is rotatably mounted a spur gear 87 in the side of which is a recess 88 in which may be seated a link 89 pivoted to the gear at 90. The bearing 86 is stationary and has a recess which, as the gear 87 rotates, is adapted to register with the recess in the gear so as to permit the link 89 to move into the recess in the bearing. The recess in the bearing may be provided by cutting away a circumferential portion of the bearing to a suitable depth to accommodate the desired amplitude of movement of the link 89 and provision is made for positively moving the link 89 out of the recess in the bearing into the recess in the gear by giving a proper shape to the inner wall of the bearing recess. As indicated at 91 in Figs. 8 and 9 said inner wall provides a stationary cam which, when the gear 87 rotates in the direction indicated by the arrow, causes the link 89 to move in a direction to seat it in the recess in the gear.

As shown in Figs. 1, 8 and 9, a rock arm 92 is pivoted at its lower end to the frame at 93 and at its upper end pivoted to a detachable bearing block 94 in which the outer sleeve of the gripper is rotatably mounted. In order to oscillate the rock arm 92 so as to effect the advancing and retracting movements of the gripper, the driver, or gear, 87 is operatively connected to the rock arm 92 through the instrumentality of the link 89. The numeral 95 indicates a longitudinal slot in the arm 92. Longitudinally slidable in this slot is a cross head or block 96 to which the free end of the link 89, hereinbefore referred to, is pivoted, as indicated at 97. Thus the driving gear 87 is loosely articulated with the bearing 94 of the gripper through the pin and slot connection between the rock arm and the driving gear 87. Further, inasmuch as in the present embodiment the gripper moves rectilineally and the rock arm moves in a circular path, the rock arm 92 is made extensible and contractible by providing the upper portion 100, which is immediately connected to the bearing block 94, with a sleeve slidably telescoping with a reduced part 101 of the lower portion.

In making a blade according to the method herein referred to a piece of steel stock of cylindrical cross-section may be used (Fig. 16). The stock should be of sufficient length and thickness to be fashioned into a blade having the desired dimensions as to length, breadth and thickness, as well as into a handle or tang integral with the blade. Having determined upon the length and diameter of the stock, a portion of the length of this blank is fashioned into a handle or tang by a forging operation. A drop-forging operation may be used, the blank being first heated to the required temperature. Fig. 17 illustrates the blank after the drop-forging operation. It will be observed that the forging operation has produced the handle 110 and also that part or heel of the blade immediately adjacent the handle, indicated by the numeral 111, and that fins, or "flashes" of the metal 112 extend from the edges of the handle and blade portions. The major blade portion of the blank indicated by the numeral 113 (Fig. 17) is, in one operation, swaged into substantially the shape and dimensions of the blade desired, this operation being performed between the swaging rolls 34 and 35 hereinbefore described. Preliminary to the rolling swaging operation, that part of the stock which is to form the major portion of the blade is heated to the proper temperature, a temperature of 1600° F. being a practical temperature for the purpose. In the machine hereinbefore referred to this heating is accomplished progressively as the blanks move past the combustion chamber of the furnace. Any fins or "flashes" of the metal remaining after the swaging operation by the rolls may be removed by a trimming operation while the blank is cold. Also in this trimming operation more exact dimensions as to length and breadth may be obtained. The article resultant from the drop-forging, swaging and trimming operations will be a knife blade provided with an integral tang or handle. In Figs. 17 and 18 the tang is illustrated in dotted lines at 114.

It will be understood that the machine hereinbefore referred to is utilized, after the drop-forging operation, to heat the drop-forged blanks and supply and remove them from the swaging rolls. In operation, blanks from the drop-forging operation are inserted in the blank holders of the carrier between the spring 27 and the elevated portion of the cross piece 25, the handle or tang of the blank lying in the recess 26 which should be properly shaped to receive one or the other part. The choil of the blank indicated by the numeral 111 (Fig. 17) will be beyond the end of the blank holder. As the blanks pass over the furnace they are heated to the proper temperature and ultimately arrive one by one into the sphere of operations of the reciprocatory gripper. When the operating dogs 74 and 75 reach the switches 79 on the retractive stroke of the gripper jaws they will open for the purpose of releasing a previously gripped blank and they continue open to the end of the retractive path of the gripper, whereupon the operating dogs escape the ends of the outer tracks 76, the spring 73 causing the gripper jaws to close. At this time these jaws will be upon opposite sides of the foremost blank held by the carrier and will grasp such blank, the handle or tang being received in recesses in the proximate faces of the gripper jaws 65 and 66, so that the blank will be snugly gripped and resist endwise motion relative to the gripper in either direction. Thereupon the gripper makes an advance stroke, the dogs 74, 75 forcing the switches out of their path as above described, and the blank in the gripper is presented into cooperative relation with the swaging rolls. In the present embodiment the main portions of the swaging rolls are spaced apart sufficiently to permit the flat gripper jaws to enter therebetween, the die portions of these rolls being at an increased radial distance as will appear from an examination of Fig. 2 of the drawings. Thus the gripper advances the blank into position between the rolls and to such a distance that, as the rolls rotate the foremost portions of the dies contact with the blade portion of the blank adjacent the heel or choil 111 of the partially fashioned blank. The rotation of the swaging rolls is in the direction indicated by the arrows in Fig. 2, so that, as they operate on the blank, they at the same time move it therewith on its retractive stroke, i. e., to the left in Fig. 2. The speed of retraction of the blank gripped between the swaging dies is greater than the retractive speed of the gripper otherwise normally caused by the driving mechanism only. Hence, on its retractive stroke, the gripper, for a portion of its path, moves at a different rate of speed from that normally caused by the driving mechanism therefor. It will be perceived, however, that the connection between the rock arm 92 and the gear 87, including the link 89, movable transversely of the axis of the gear, and the block 96 sliding in the slot 95, provides a lost motion device, or connection, permitting a retractive movement of the gripper at a greater rate of speed than the normal rate of retraction due to the gripper driving mechanism alone. In this way provision is made for retractive movement of the gripper under the influence of the swaging dies without interrupting the movement of the normal driving mechanism. During the retractive movement of the gripper under the influence of the swaging dies the link 89 moves into the recess in the bearing 86 and also is translated in a rotary path by reason of its pivotal connection to the gear as indicated at 90. This translatory movement of the link with the gear 87 causes it to wipe along the stationary cam 91 so that before a complete rotation of the gear has been effected the link 89 will have been returned to the recess in the gear and thereby the speed of movement of the gripper will be restored to the normal speed resultant from the train of connections from the gear 87. It will thus be seen that the link 89 with the connections described provides a lock for the lost motion device which is controlled by the engagement of the cam 91 with the curved face of the link as the latter advances with the gear 87 to lock the lost motion device against lost motion movement, the lock being released when the link again reaches the position to fall into the recess in the bearing 86, as shown in Fig. 9. The gripper retains its grip on the blank during the swaging operation and during the retractive movement effected by the swaging rolls, the spring 73, (Fig. 14) keeping the gripper jaws closed and being movable with the gripper.

It will be observed that, during oscillation of the arm 92, the lug thereon, shown in Fig. 8, will engage with the inclined cam face 30 to effect corresponding oscillation of the rock arm 28, thus imparting a step by step movement to the carrier for the supply of blanks through the link 31 and the ratchet 32, 33 as shown in Fig. 1.

Thus by the above described instrumentalities are accomplished among others the objects hereinbefore referred to.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:—

1. In an apparatus of the character described, in combination, a pair of swaging dies, a gripper adapted to advance blanks into operative relation with said dies, a blank carrier adapted to advance blanks into the sphere of operation of said gripper, and a furnace adapted to heat the blanks on said carrier, 2. In an apparatus of the character described, in combination, a pair of swaging rolls, a gripper adapted to advance blanks into operative relation with said rolls, a blank carrier adapted to advance blanks into the sphere of operation of said gripper, and a furnace adapted to heat the blanks on said carrier.

3. In an apparatus of the character described, in combination, a pair of swaging dies, a gripper adapted to advance blanks into operative relation with said dies, a blank carrier adapted to advance blanks into the sphere of operation of said gripper, a furnace adapted to heat the blanks on said carrier, and mechanism adapted to advance and retract said gripper including a lost motion connection permitting a retractive movement of said gripper at a greater rate of speed than the normal rate of retraction due to said advancing and retracting mechanism.

4. In an apparatus of the character described, in combination, a pair of swaging dies, a gripper adapted to advance blanks into operative relation with said dies, an intermittently movable blank carrier adapted to advance blanks into the sphere of operation of said gripper, and a furnace adapted to heat the blanks on said carrier.

5. In an apparatus of the character described, in combination, a pair of swaging dies, a gripper adapted to advance blanks into operative relation with said dies, a blank carrier adapted to advance blanks into the sphere of operation of said gripper, and a furnace adapted to heat the blanks on said carrier, said furnace and carrier being so disposed relative to each other that the blanks are progressively heated as they advance toward said gripper.

6. In an apparatus of the character described, in combination, a pair of swaging rolls, a gripper adapted to advance blanks into operative relation with said rolls, a blank carrier adapted to advance blanks into the sphere of operation of said gripper, a furnace adapted to heat the blanks on said carrier, and mechanism adapted to advance and retract said gripper including a lost motion connection permitting a retractive movement of said gripper at a greater rate of speed than the normal rate of retraction due to said advancing and retracting mechanism.

7. In an apparatus of the character described, in combination, a pair of swaging dies, a gripper adapted to advance blanks into operative relation with said dies, an intermittently movable blank carrier adapted to advance blanks into the sphere of operation of said gripper, a furnace adapted to heat the blanks on said carrier, and mechanism adapted to advance and retract said gripper including a lost motion connection permitting a retractive movement of said gripper at a greater rate of speed than the normal rate of retraction due to said advancing and retracting mechanism.

8. In an apparatus of the character described, in combination, a pair of swaging dies, a gripper adapted to advance blanks into operative relation with said dies, an intermittently movable blank carrier adapted to advance blanks into the sphere of operation of said gripper, a furnace adapted to heat the blanks on said carrier, and mechanism adapted to advance and retract said gripper including a lost motion connection permitting a retractive movement of said gripper at a greater rate of speed than the normal rate of retraction due to said advancing and retracting mechanism, said furnace and carrier being so disposed relative to each other that the blanks are progressively heated as they advance toward said gripper.

9. In an apparatus of the character described, in combination, a pair of swaging rolls, a gripper adapted to advance blanks into operative relation with said rolls, an intermittently movable blank carrier adapted to advance blanks into the sphere of operation of said gripper, a furnace adapted to heat the blanks on said carrier, and mechanism adapted to advance and retract said gripper including a lost motion connection permitting a retractive movement of said gripper at a greater rate of speed than the normal rate of retraction due to said advancing and retracting mechanism.

10. In an apparatus of the character described, in combination, a pair of swaging rolls, a gripper adapted to advance blanks into operative relation with said rolls, an intermittently movable blank carrier adapted to advance blanks into the sphere of operation of said gripper, a furnace adapted to heat the blanks on said carrier, and mechanism adapted to advance and retract said gripper including a lost motion connection permitting a retractive movement of said gripper at a greater rate of speed than the normal rate of retraction due to said advancing and retracting mechanism, said furnace and carrier being so disposed relative to each other that the blanks are progressively heated as they advance toward said gripper.

11. In an apparatus of the character described, in combination, a gripper, a driver, and operative connections between said gripper and said driver to effect positive advancement and retraction of said gripper, said connections including a device for releasing said gripper for a portion of its movement to movement independent of that caused by said operative connections and for subsequently restoring said device so as to effect positive advancement by said operative connections.

12. In an apparatus of the character described, in combination, a gripper, a rotatable driver, and operative connections between said gripper and said driver to effect positive advancement and retraction of said gripper, said connections including a device permitting a period of movement of said gripper at a rate of speed different from that otherwise normally caused by said driver.

13. In an apparatus of the character described, in combination, a gripper, a driver, operative connections between said gripper and said driver to effect positive advancement and retraction of said gripper, said connections including a device permitting a period of movement of said gripper at a rate of speed different from that otherwise normally caused by said driver, and means adapted to restore the speed of movement of said gripper to normal.

14. In an apparatus of the character described, in combination, a gripper, a driver, operative connections between said gripper and said driver to effect positive advancement and retraction of said gripper, said connections including a device permitting a period of movement of said gripper at a rate of speed different from that otherwise normally caused by said driver, and means adapted to co-operate to move said gripper at a rate of speed different from that caused by said driver.

15. In an apparatus of the character described, in combination, a gripper, a rotatable driver, and operative connections between said gripper and said driver to effect oscillation of said gripper, said connections including a link pivoted to said driver for oscillation transversely of the axis of rotation thereof.

16. In an apparatus of the character described, in combination, a gripper, a rotatable driver, operative connections between said gripper and said driver to effect oscillation of said gripper, said connections including a link pivoted to said driver for oscillation transversely of the axis of rotation thereof, and a stationary cam for moving said link in one direction.

17. In an apparatus of the character described, in combination, a gripper, a rock arm adapted to oscillate said gripper, a rotatable driver, and operative connections between said driver and said arm including a link pivoted to said driver for movement relative thereto transversely of the axis thereof.

18. In an apparatus of the character described, in combination, a gripper, a rock arm adapted to oscillate said gripper, a rotatable driver, and operative connections between said driver and said arm including a link pivoted to said driver for movement relative thereto transversely of the axis thereof, said link having sliding connection with said rock arm.

19. In an apparatus of the character described, in combination, a gripper, a rock arm adapted to oscillate said gripper, a rotatable driver, operative connections between said driver and said arm including a link pivoted to said driver for movement relative thereto transversely of the axis thereof, and a cam adapted to co-operate with said link to move the same in one direction on its pivotal axis.

20. In an apparatus of the character described, in combination, a gripper, a rock arm adapted to oscillate said gripper, a rotatable driver, and operative connections between said driver and said arm, including a link pivoted to said driver for movement relative thereto transversely of the axis thereof, said link having sliding connection with said rock arm, and a stationary cam adapted to co-operate with said link to move the same in one direction on its pivotal axis.

21. In an apparatus of the character described, in combination, a gripper, a rock arm for oscillating said gripper, a stationary bearing, a gear rotatable on said bearing, and a link pivoted at the side of said gear and operatively connected to said arm.

22. In an apparatus of the character described, in combination, a gripper, a rock arm for oscillating said gripper, a stationary bearing, a gear rotatable on said bearing having a recess in its side, a link seated in said recess pivoted to said gear for movement transversely of the axis of said gear and operatively connected to said arm, said bearing having a recess adapted to register with the recess in said gear and a cam adapted to co-operate with said link.

23. In an apparatus of the character described, in combination, an oscillatable gripper, a rod by which said gripper is guided, an extensible and contractible rock arm pivotally connected to said gripper for oscillating the same, a stationary bearing having a recess in its surface, a gear rotatable on said bearing having a recess adapted to register with the recess in said bearing, and a link slidably connected to said arm and pivoted to said gear for movement transversely of the axis of said gear into and out of the recess in said bearing.

24. In an apparatus of the character described, in combination, an oscillatable gripper, a rod by which said gripper is guided, an extensible and contractible rock arm pivotally connected to said gripper for oscillating the same, a stationary bearing having a recess in its surface, a gear rotatable on said bearing having a recess adapted to register with the recess in said bearing, and a link slidably connected to said arm and pivoted to said gear for movement transversely of the axis of said gear into and out of the recess in said bearing, the inner wall of the recess in said bearing providing a cam co-operative to move said link into the recess in said gear.

25. In an apparatus of the character described, in combination, an oscillatable gripper, a rod by which said gripper is guided, an extensible and contractible rock arm pivotally connected to said gripper for oscillating the same, a stationary bearing having a recess in its surface, a gear rotatable on said bearing having a recess adapted to register with the recess in said bearing, and a link having pin and slot connection with said arm and pivoted to said gear for movement transversely of the axis of said gear into and out of the recess in said bearing, the inner wall of the recess in said bearing providing a cam co-operative to move said link into the recess in said gear.

26. In an apparatus of the character described, in combination, an oscillatory gripper including a pair of jaws adapted to open and close, means adapted to open and close said jaws at predetermined points in the stroke of the gripper including a dog on one of said jaws, a pair of transversely spaced tracks alongside the oscillatory path of said gripper on which said dog is adapted to run, and means adapted to switch said dog from one track to the other as the gripper oscillates.

27. In an apparatus of the character described, in combination, an oscillatory gripper including a pair of jaws adapted to open and close, means adapted to open and close said jaws at predetermined points in the storke of the gripper including a dog on one of said jaws, a pair of transversely spaced tracks alongside the oscillatory path of said gripper on which said dog is adapted to run, means adapted to switch said dog from one track to the other as the gripper oscillates, including a switch in the path of movement of the dog on one track, and a spring adapted to urge said switch into switching position.

28. In an apparatus of the character described, in combination, an oscillatory gripper including a pair of jaws adapted to open and close, means adapted to open and close said jaws at predetermined points in the stroke of the gripper, including a dog on one of said jaws, a pair of transversely spaced tracks alongside the oscillatory path of said gripper on which said dog is adapted to run, means adapted to switch said dog from one track to the other as the gripper oscillates, including a switch in the path of movement of the dog on one track, and a spring adapted to urge said switch into switching position, one of said tracks extending beyond the other at the end opposite said switch.

29. In an apparatus of the character described, in combination, a guide rod, a gripper including a gripper jaw sleeve concentric with and oscillatable on said rod, a second gripper jaw sleeve concentric with the first, and means adapted to rotate one of said sleeves relative to the other to open and close the gripper jaws, including a pair of tracks alongside the oscillatory path of said gripper spaced apart transversely of said guide rod, a dog on one of said sleeves adapted to run on said tracks, a spring tending to rotate said rotatable sleeve in a direction to close said gripper and to urge said dog against said tracks, a switch in the path of the dog on one track, and a spring adapted to urge said switch into switching position.

30. In an apparatus of the character described, in combination, a gripper including a pair of concentric relatively rotatable sleeves each having a gripper jaw extending in a radial direction therefrom.

31. In an apparatus of the character described, in combination, a gripper including a pair of concentric relatively rotatable sleeves each having a gripper jaw, and a jaw operating dog extending in a radial direction therefrom.

32. In an apparatus of the character described, in combination, a gripper including a pair of concentric relatively rotatable sleeves each having a gripper jaw and a jaw operating dog extending in a radial direction therefrom, and a spring adapted to urge said sleeves relative to each other in a direction to close said jaws.

33. In an apparatus of the character described, in combination, a gripper including a pair of concentric relatively rotatable sleeves each having a gripper jaw extending in a radial direction therefrom, the inner sleeve extending beyond the outer sleeve at one end of the gripper, a collar on the extended portion of and rotatable with said inner sleeve, and jaw operating dogs, one on said collar and another on said outer sleeve.

34. In an apparatus of the character described in combination, a gripper including a pair of concentric relatively rotatable sleeves each having a gripper jaw extending in a radial direction therefrom, the inner sleeve extending beyond the outer sleeve at one end of the gripper, a collar on the extended portion of and rotatable with said inner sleeve, and jaw operating dogs, one on said collar and another on said outer sleeve, said collar and said outer sleeve having lugs, and a spring co-operating with said lugs to urge said sleeves rotatively relative to each other in a direction to close the gripper jaws.

35. In an apparatus of the character described, in combination, a gripper including a pair of concentric relatively rotatable sleeves each having a gripper jaw and a jaw operating dog extending in a radial direction therefrom, a spring adapted to urge said sleeves relative to each other in a direction to close said jaws, and a bearing in which said outer sleeve is rotatively mounted.

36. In an apparatus of the character described, in combination, a gripper including a pair of concentric relatively rotatable sleeves each having a gripper jaw extending in a radial direction therefrom, the inner sleeve extending beyond the outer sleeve at one end of the gripper, a collar on the extended portion of and rotatable with said inner sleeve, jaw operating dogs, one on said collar and another on said outer sleeve, said collar and said outer sleeve having lugs, a spring co-operating with said lugs to urge said sleeves rotatively relative to each other in a direction to close the gripper jaws, and a detachable bearing in which said outer sleeve is rotatively mounted.

37. In an apparatus of the character described, in combination, a blank carrier, and means adapted to intermittently operate said carrier including a rock arm having a cam surface, a second rock arm having a follower adapted to co-operate with said surface to actuate the first mentioned rock arm, a rotatable driver, and a link connecting said second rock arm to said driver to actuate said second rock arm.

38. In an apparatus of the character described, in combination, a blank carrier, means adapted to intermittently operate said carrier including a rock arm having a cam surface, a second rock arm having a follower adapted to co-operate with said surface to actuate the first mentioned rock arm, a rotatable driver, a link connecting said second rock arm to said driver to actuate said second rock arm, a ratchet operatively connected to said blank carrier, and a pawl co-operative with said ratchet and actuated from said first mentioned rock arm.

39. In an apparatus of the character described, in combination, a blank carrier, means adapted to intermittently operate said carrier including a rock arm having a cam surface, a second rock arm having a follower adapted to co-operate with said surface to actuate the first mentioned rock arm, a rotatable driver, a link connecting said second rock arm to said driver to actuate said second rock arm, a ratchet operatively connected to said blank carrier, a pawl co-operative with said ratchet and actuated from said first mentioned rock arm, and a spring tending to oppose actuation of said first mentioned rock arm by said second rock arm.

40. In an apparatus of the character described, in combination, an oscillatory gripper including a pair of concentric relatively rotatable telescoping sleeves each having a gripper jaw, a radially extending jaw operating dog on one of said sleeves, means movable with the gripper adapted to urge one of said sleeves relative to the other in a direction to close said jaws and move said dog, a pair of tracks alongside the oscillatory path of said gripper in which said dog is adapted to run, said tracks being spaced apart transversely of the oscillatory path of said gripper, and means adapted to switch said dog from one track to the other as the gripper oscillates.

41. In an apparatus of the character described, in combination, an oscillatory gripper including a pair of concentric relatively rotatable telescoping sleeves each having a gripper jaw, a jaw operating dog, means movable with the gripper adapted to effect relative rotation of said sleeves in a direction to close said jaws and rotate said dogs, a bearing in which the outer sleeve is rotatively mounted, a rock arm loosely articulated with said bearing, and means adapted to rock said arm to effect oscillation of said gripper.

42. In an apparatus of the character described, in combination, an oscillatory gripper including a pair of concentric relatively rotatable telescoping sleeves each having a gripper jaw, a jaw operating dog, means movable with the gripper adapted to effect relative rotation of said sleeves in a direction to close said jaws and rotate said dogs, a bearing in which the outer sleeve is rotatively mounted, a rock arm loosely articulated with said bearing, and means adapted to rock said arm to effect oscillation of said gripper including a rotary driver and a link operatively connected to said rock arm and pivoted to said driver for movement transversely of the axis of rotation of said driver.

43. In an apparatus of the character described, in combination, a swaging device including a rotary swaging member having rolling swaging engagement with a blank, a blank carrier including a gripper for advancing a blank to said swaging device and retaining grip thereon during a rolling swaging action upon the blank automatic means to operate said gripper to grip a blank from a supply source and to release grip thereon after the swaging operation, and means for permitting movement of said blank and gripper by said rolling action when the blank is gripped by said gripper.

44. In an apparatus of the character described, in combination, a swaging device including a rotary swaging member having rolling swaging engagement with a blank, a blank carrier including a gripper for advancing a blank to said swaging device and retaining grip thereon during a rolling swaging action upon the blank, automatic means to operate said gripper to grip a blank from a supply source and to release grip thereon after the swaging operation, positive operating connection for moving said blank carrier toward and away from said swaging device and means for permitting movement of said blank and gripper by said rolling action when the blank is gripped by said gripper.

45. In an apparatus of the character described, in combination, a pair of swaging rolls, a gripper adapted to advance a blank to said rolls and retain grip thereon during swaging of the blank, said rolls co-operating, as the blank is swaged, to retract said blank and the gripper in which it is held, and operating connections having positive connection with said gripper to advance and retract the same relative to said rolls.

46. In an apparatus of the character described, in combination, a pair of swaging rolls, a gripper adapted to advance a blank to said rolls and retain grip thereon during swaging of the blank, said rolls co-operating, as the blank is swaged, to retract said blank and the gripper in which it is held, and means connected to said gripper to advance and retract the same relative to said rolls, including a lost motion connection adapted to permit the retractive movement of said blank and gripper under the influence of said rolls at a greater rate of speed than the normal rate of retraction due to said advancing and retracting means.

47. In an apparatus of the character described, in combination, a pair of swaging rolls, and a gripper adapted to advance a blank into swaging co-operation with said rolls and retain grip on the blank during swaging, said gripper including at one end a pair of flat jaws adapted to lie in planes generally parallel to the axes of said rolls when in gripping relation adjacent said rolls.

48. In an apparatus of the character described, in combination, a pair of swaging rolls, and a gripper adapted to advance a blank into swaging co-operation with said rolls and retain grip on the blank during swaging, said gripper including a pair of concentric relatively rotatable sleeves each having a flat gripper jaw extending in a radial direction from one end.

49. In an apparatus of the character described, in combination, a frame, a pair of horizontal rolls journaled in and projecting outside said frame and having swaging instrumentalities on the projecting portions, a horizontal guide rod extending between said rolls outside said frame, a blank gripper longitudinally reciprocal on said rod toward and from said rolls, including concentric telescoping gripper jaw sleeves rotatable relative to said rod, a rock arm adapted to reciprocate said gripper, and tracks alongside the path of movement of said gripper adapted to co-operate with the gripper jaw sleeves to open and close the jaws as the gripper reciprocates.

50. In an apparatus of the character described, in combination, a blank carrier intermittently movable in an endless path including a plurality of blank holders having recessed blank supporting faces and springs to yieldingly retain blanks in said recesses, a reciprocal gripper movable transversely of the path of said holders, means adapted to cause said gripper to draw the blanks from said holders one by one, and a pair of swaging rolls to which said blanks are supplied by said gripper.

51. In an apparatus of the character described, in combination, means to move a blank along a selected path, means to progressively heat the blank while it is traveling over the path, means to swage the blank, and means to receive the blank from the moving means and present it to the swaging means.

52. In an apparatus of the character described, in combination, means to move a blank along a selected path, means to progressively heat the blank while it is traveling over the path, means to swage the blank, and means to receive the blank from the moving means and present it to the swaging means, including a reciprocating gripper controlled to closed position as it moves from the moving means to the swaging means and to open position as it moves in the opposite direction.

53. In an apparatus of the character described, in combination, means to move a blank along a selected path, means to progressively heat the blank while it is traveling over the path, means to swage the blank, means to receive the blank from the moving means and present it to the swaging means, including a reciprocating gripper, means to hold the gripper closed while it is traveling toward the swaging means, and means to release the gripper as it moves in the opposite direction.

54. In an apparatus of the character described, in combination, a heating means for blanks, a swaging device, a supply carrier to progressively move a supply of blanks through said heating means to heat the blanks, a blank carrier for carrying the blanks between said first mentioned carrier and said swaging device and having a gripper movable bodily toward and away from said swaging device, and means for controlling said gripper to grip a heated blank and carry it into the sphere of operation of said swaging device and to hold it during a swaging operation thereon.

55. In an apparatus of the character described in combination, means to swage a blank, means to progressively heat the blank, and means to remove the blank from the heating means and present it to the swaging means, including a gripper controlled to grip the blank while moving in one direction, and to release the blank while moving in the opposite direction.

56. In an apparatus of the character described, in combination, a reciprocable blank holder, operative connections for effecting reciprocation of said holder, a lost motion device in said operative connections, and means for locking said lost motion device.

57. In an apparatus of the character described, in combination, a reciprocable blank holder, operative connections for effecting reciprocation of said holder, a lost motion device in said operative connections, means for locking said lost motion device, and means automatically operative at a predetermined point in the movement of said holder for operating said locking means.

58. In an apparatus of the character described, in combination, a reciprocable blank holder, operative connections for effecting reciprocation of said holder, a lost motion device in said operative connections, a lock for said lost motion device, and automatic operative mechanism for said lock to place it in locking position when the blank holder is near one terminal of its movement and to place it in released position after the blank has been advanced.

59. In an apparatus of the character described, in combination, a swaging device, a blank carrier movable to carry blanks between a supply source and said swaging device, driving connections for said blank carrier, a lost motion device for said driving connections, a lock for said lost motion device, and means to release said lock to permit movement of said carrier independently of said driving connections.

60. In an apparatus of the character described, in combination, a swaging device, a blank carrier movable to carry blanks between a supply source and said swaging device, driving connections for said blank carrier, a lost motion device for said driving connections, a lock for said lost motion device, means to release said lock to permit movement of said carrier independently of said driving connections, and means controlled by the operation of said carrier to advance blanks into position to be received by the carrier.

61. In an apparatus of the character described, in combination, a swaging device, a blank carrier movable to carry blanks between a supply source and said swaging device and having a gripper to hold a blank during a swaging operation thereon, driving connections for said blank carrier, means to release said gripper when the carrier has passed beyond the sphere of operation of said swaging device, and means controlled by the operation of said carrier to advance blanks into position to be received by the carrier.

62. In an apparatus of the character described, in combination, a swaging device, a blank carrier movable to carry blanks between a supply source and said swaging device, a blank gripper on said carrier, and means to control said gripper to grip a blank at said supply source and to release it after it has been advanced to said swaging device.

63. In an apparatus of the character described, in combination, a swaging device, a blank carrier movable to carry blanks between a supply source and said swaging device, a blank gripper on said carrier, means to control said gripper to grip a blank at said supply source and to release it after it has been advanced to said swaging device, and means controlled by said carrier operating means to advance blanks into position to be received by said gripper.

64. In an apparatus of the character described, in combination, a swaging device, a blank carrier movable to carry blanks between a supply source and said swaging device, and driving connections for said blank carrier including a pivoted link and a cam for moving said link into fixed position relative to its pivot.

65. In an apparatus of the character described, in combination, a swaging device, a blank carrier movable to carry blanks between a supply source and said swaging device, and driving connections for said blank carrier including a rotary driving member, a link pivoted to said rotary driving member and a cam for moving said link into fixed position relative to said rotary driving member.

66. In an apparatus of the character described, in combination, a heating means for blanks, a swaging device, a supply carrier to progressively move a supply of blanks through said heating means to heat the blanks, a blank carrier for carrying the blanks between said first mentioned carrier and said swaging device and having a gripper movable bodily toward and away from said swaging device, means for controlling said gripper to grip a heated blank and carry it in the sphere of operation of said swaging device and to hold it during a swaging operation thereon, and means for releasing said gripper to release the blank after it has been removed from said swaging device.

In testimony whereof I affix my signature.

EDWARD E. WOOD.